US006076059A

United States Patent [19]
Glickman et al.

[11] Patent Number: 6,076,059
[45] Date of Patent: Jun. 13, 2000

[54] METHOD FOR ALIGNING TEXT WITH AUDIO SIGNALS

[75] Inventors: Oren Glickman, Brookline; Christopher Frank Joerg, Watertown, both of Mass.

[73] Assignee: Digital Equipment Corporation, Maynard, Mass.

[21] Appl. No.: 08/921,347

[22] Filed: Aug. 29, 1997

[51] Int. Cl.[7] .................................................. G10L 5/02
[52] U.S. Cl. ................................. 704/260; 704/252
[58] Field of Search .................... 704/278, 251, 704/260, 231

[56] References Cited

U.S. PATENT DOCUMENTS

| 5,333,275 | 7/1994 | Wheatley et al. | 704/2.52 |
| 5,649,060 | 7/1997 | Ellozy et al. | 395/2.87 |
| 5,737,725 | 4/1998 | Case | 704/260 |

FOREIGN PATENT DOCUMENTS

0649144A1  4/1995  European Pat. Off. .

OTHER PUBLICATIONS

Lee, "Large Vocabulary Speaker Independent Continuous Speech Recognition: The SPHINX System", Carnegie Mellon University, Apr. 18, 1988.

Hauptmann, A., et al., Indexing and Search of Multimodal Information, 1997 IEEE International Conference on Acoustics, Speech, and Signal Processing (Cat. No. 97CB36052), 1997 IEEE International Conference on Acoustics and Speech, and Signal Processing, Munich, Germany, Apr. 21–24, 1997, pp. 195–198, vol. 1, XP002113843, 1997, Los Alamitos, CA, USA, IEEE Comput. Soc. Press, USAISBN: 0–8186–7919–0, Paragraph "Speech recognition for alignment".

Communication European Search Report, Sep. 13, 1999.

*Primary Examiner*—Krista Zele
*Assistant Examiner*—Michael N. Opsasnick
*Attorney, Agent, or Firm*—Cesari & McKenna

[57] ABSTRACT

In a computerized method, text segments of a text file are aligned with audio segments of an audio file. The text file includes written words, and the audio file includes spoken words. A vocabulary and language model are generated from the text segment. A word list is recognized from the audio segment using the vocabulary and language model. The word list is aligned with the text segment, and corresponding anchors are chosen in the word list and text segment. Using the anchors, the text segment and the audio segment are partitioned into unaligned and aligned segments according to the anchors. These steps are repeated for any unaligned segments until a termination condition is reached.

22 Claims, 7 Drawing Sheets ations.
METHOD FOR ALIGNING TEXT WITH AUDIO SIGNALS

FIELD OF THE INVENTION

This invention relates generally to the processing of speech signals, and more particularly to aligning digitized text to analog spoken words.

BACKGROUND OF THE INVENTION

In a computerized information retrieval application, a user may desire to locate portions of an audio file, e.g., a taped radio program, that have specific content. If the retrieval application has an aligned text transcript of the audio file, then the text file can be searched using conventual text query techniques to locate the corresponding portion in the audio file. In effect, the alignment enables direct access into the audio file by words. Audio-to-text alignment can also be used to search a video file (video) when the video includes an audio stream aligned with a text transcript, e.g., the video signal is closed captioned.

Most known alignment methods are extensions of conventional computerized speech recognizers that operate in a very restricted mode to force recognition of the target text. Typically, the alignment is done in a left-to-right manner by moving a recognition window forward in time over the audio signals. The width of the window, measured in time, can be large enough to allow the recognizer to recover from local errors. This type of alignment is probably better characterized as forced recognition.

The problem of forced alignment is different from the problem of recognition. In the case of recognition, the words said are unknown and the task is to recognize the spoken words. With alignment, the text is known but the time alignment of the text with the spoken words of the audio stream is unknown.

Therefore, methods based on forced recognition have quite a few drawbacks and limitations. For example, those methods perform poorly with noisy or other difficult audio streams, as in the case where non-speech audio signals are overlaid with the spoken words. In addition, when the audio stream is long, e.g., an hour or more, there is a very high probability of a gross error in the alignment. Because these methods are based on a single left-to-right pass over the audio stream, a single error early in the pass can cause the remaining stream to be misaligned. Furthermore, such methods might not work at all if the text does not represent the entire duration of the audio stream, but only part of it.

SUMMARY OF THE INVENTION

A computerized method is provided for aligning a text file with an audio file. The text file includes written words and the audio file includes spoken words. There is a one-to-one correspondence between some, but not necessarily all of the words of the text and audio files.

A vocabulary and language model is generated from the text segment. The language model can be in the form of trigrams that indicate the relative probabilities of one, two, and three word sequences in the text segment.

A word list annotated with timing information is generated by recognizing spoken words from the audio segment using the vocabulary and language model. The speech recognizer can be any standard speech recognizer that uses acoustic-phonetic models.

The word list is aligned with the text segment, and there may be several possible alignments. Dynamic programming techniques are used to determine a best possible alignment. Anchors corresponding to best alignments of the written and spoken words are chosen, and the anchors are used to partition the text segment and the audio segment into unaligned and aligned segments. These steps are repeated on the unaligned segments until a termination condition is reached. The termination condition can be fully aligned text and audio segments, or when a particular unaligned segment has a duration less than a predetermined threshold.

In one aspect of the invention, the vocabulary and language model is rebuilt from the unaligned segments during the next iterations.

DETAILED DESCRIPTION OF PREFERRED EMBODIMENTS

Figure 1:
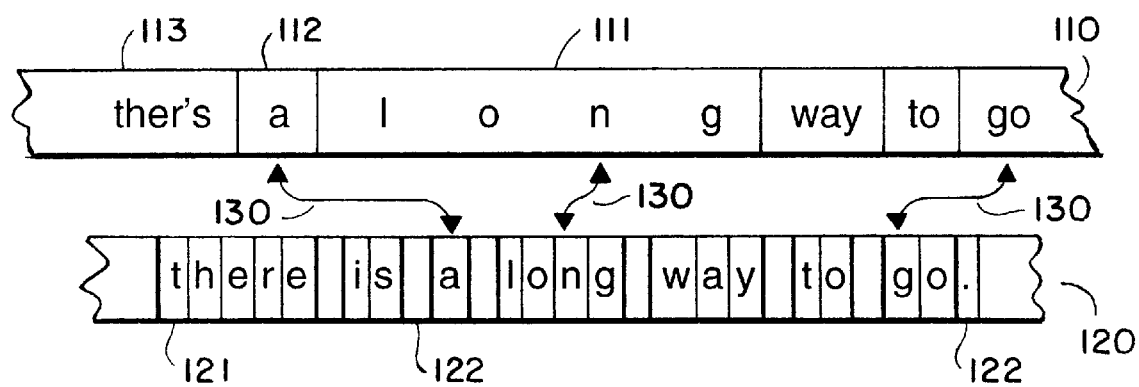
FIG. 1 is a block diagram of portions of text and audio files to be aligned according to the invention.

FIG. 1 shows portions of an audio file 110, and a corresponding text file 120 that are to be aligned according to the invention. The text file 120 is a full or partial transcription of the spoken words of the audio file.

In practice, the content of the audio file 110 is temporally related. That is, the analog audio signals continuously move forward at a steady rate over, perhaps, several hours. Some words (long 111) may be stretched out in time to give emphasis, other words (112) may be short in duration, depending on the diction of the speaker. Words 113 may blend into each other when the speech is slurred. This makes it difficult to distinguish the end of one word and the start of another.

The file 110 may also include silence and other audio signals, for example, extraneous words, music, and background noise, for which there is no corresponding text. The audio signals may also be corrupted by other channel conditions such as distortion and compression induced aberrations.

In the text file 120, the characters that form the words of the text are spatially related, that is, there is no sense of time. Each character is typically stored as a fixed length digital string (a byte 121), and spatial separation between words, sentences, and maybe even paragraphs is usually clearly delineated using punctuation marks 122, e.g., the space character or period characters.

Figure 2:
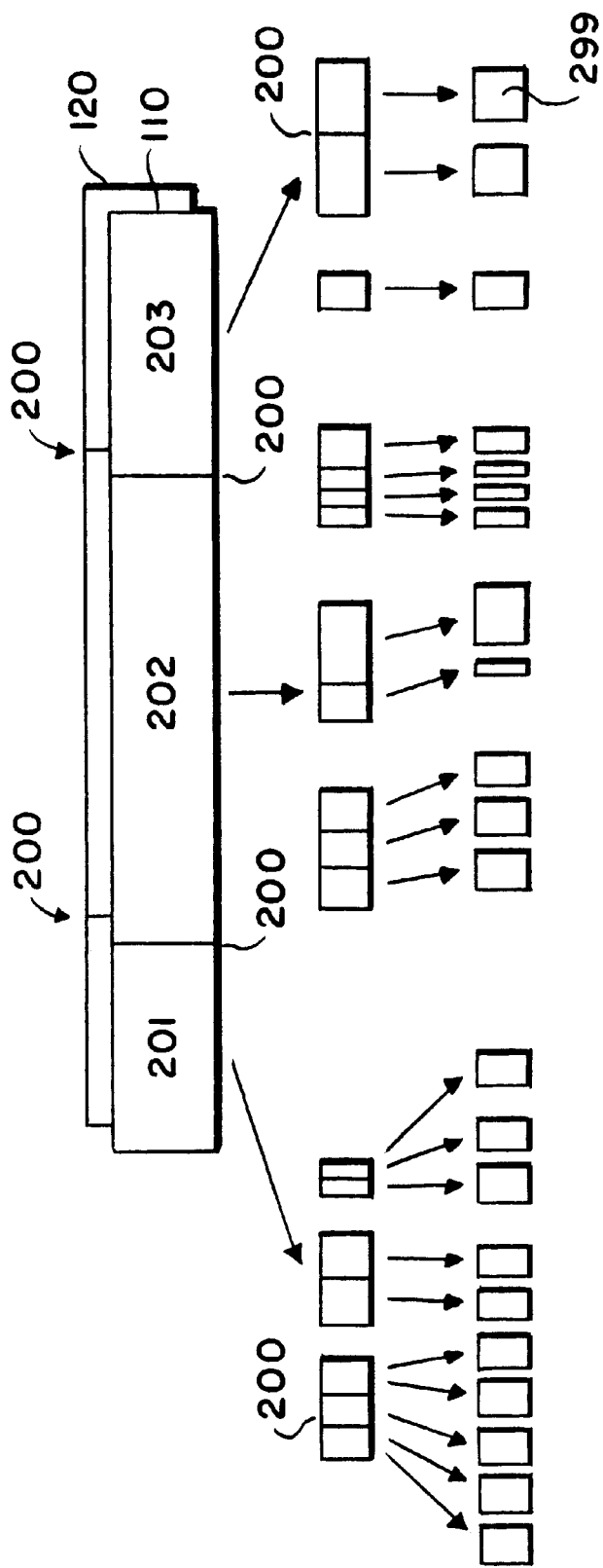
FIG. 2 is a block diagram of a top-down partitioning of the text and audio file of FIG. 1 into segments.

The problem is to align the temporally ordered audio signals with the spatially ordered text signals as shown by arrows 130. As shown in FIG. 2, in contrast with the prior art where the alignment is usually done in a serial manner, the present invention uses an iterative top-down "divide and conquer" technique.

In the iterative process, the audio and text files 110 and 120 are each partitioned into smaller segments 201, 202, 203, 204, . . . , 299, at "anchors" 200 during successive stages of the iterations. The process completes, for example, when the two files are fully aligned, or when no additional anchors can be detected.

Because of the inherent uncertainties of speech recognition, there may be several possible alignments for any one segment. Therefore, the possible alignments are scored, and best alignments are selected as the anchors where the files can correctly be partitioned into aligned and unaligned segments. Because the alignment is performed in a top-down manner, there is a smaller likelihood that there will be any gross misalignments.

Figure 3:
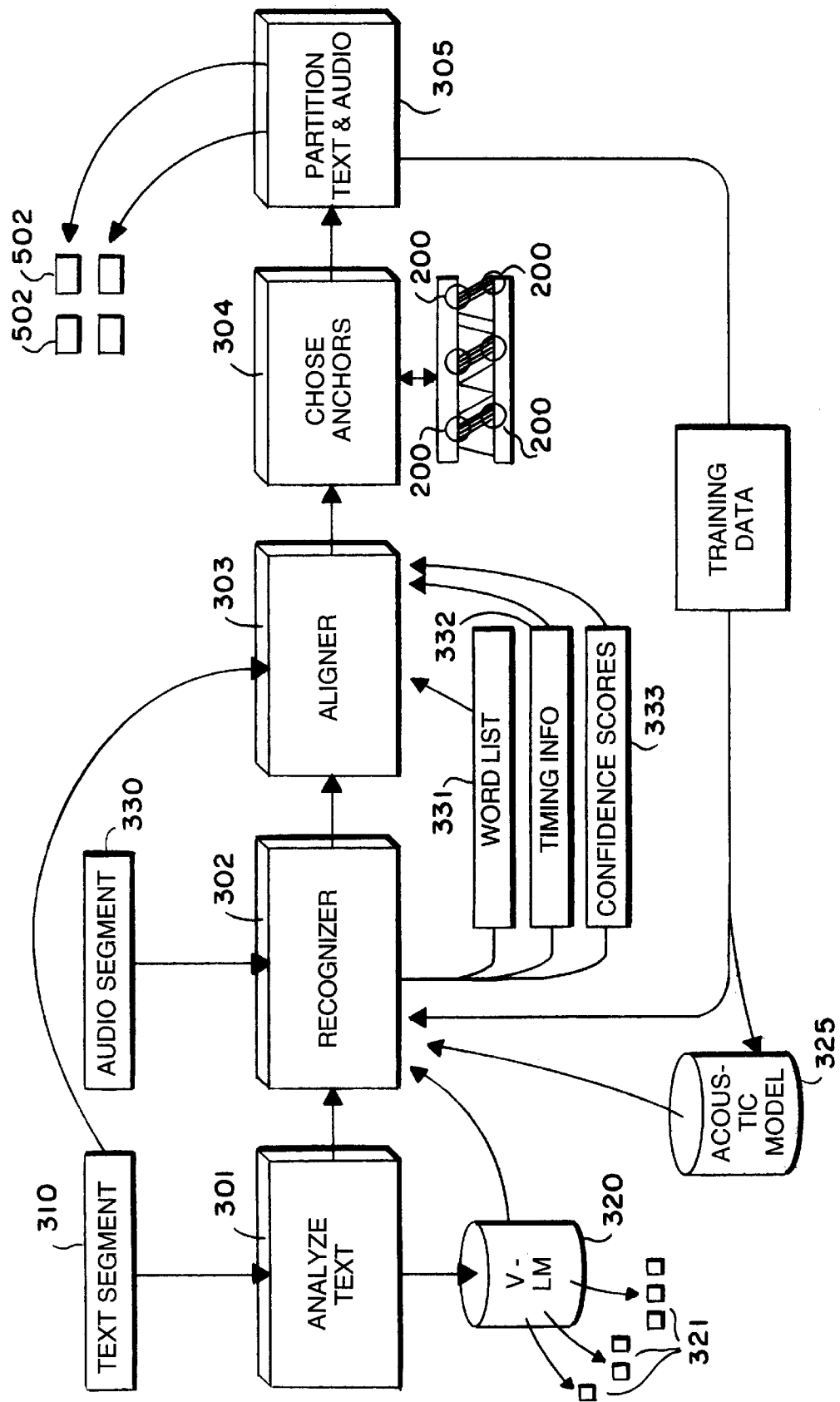
FIG. 3 is a flow diagram of a process to perform the alignment of the segments according to a preferred embodiment of the invention.

As shown in FIG. 3, the preferred method 300 begins in an analyzing step 301 by processing a current text segment 310 of the text file 120 to produce a vocabulary and language model (V-LM) 320 for the text segment 310. Initially, the current segment 310 can be the entire text file 110.

The V-LM 320 can be generated using standard language analyzing tools, such the one provided with the Sphinx II speech recognizer developed at the Carnegie-Mellon University. There, the language model is in the form of trigrams 321 where the relative probabilities of all one, two, and three word sequences are determined taking into consideration how often these sequences occur in the text segment 310.

In step 302, the corresponding segment of the audio file 330 is processed by the speech recognizer using the V-LM 320 and acoustic-phonetic models 325 to generate a word list 331 annotated with timing information 332, and possible confidence scores 333. The speech recognizer can be any standard speech recognizer. For example, the Sphinx II recognizer 203 uses Hidden Markov Modeling (HHM), however, Statistical Trajectory Modeling (STM) can also be used. The acoustic-phonetic models 325 statistically characterize acoustic-phonetic units. The acoustic-models 325 are usually trained from a training corpus. The acoustic-phonetic models 325 can, initially, be speaker independent.

The word list 331 sequentially stores only the words that were actually recognized in the audio segment 330. Note in contrast with the prior art, this step 302 is performed without considering what the words might be as indicated in the text segment 310. The timing information 332 indicates, for each recognized word, the starting time and the duration of each recognized word. The confidence scores 333 indicate the degree of certainty that the word is correctly recognized.

The word list 331 and the timing information 332 are not necessarily absolutely correct, that is, the recognized spoken words of the list 331 are only a "best guess" at the spoken words of the audio segment 330, as indicated by the confidence scores 333. Some words may be missed, and other words may be misinterpreted, e.g., "way" may be recognized as "weight."

In step 303, the recognized word list 331 is aligned with the text segment 310. Dynamic programming, or similar techniques can be used to align the word list 331 and the text segment 310. Dynamic programming techniques that determine a best one-to-one correspondence between two lists of "tokens" are well known. Here, the tokens are spoken words and text words.

Figure 4:
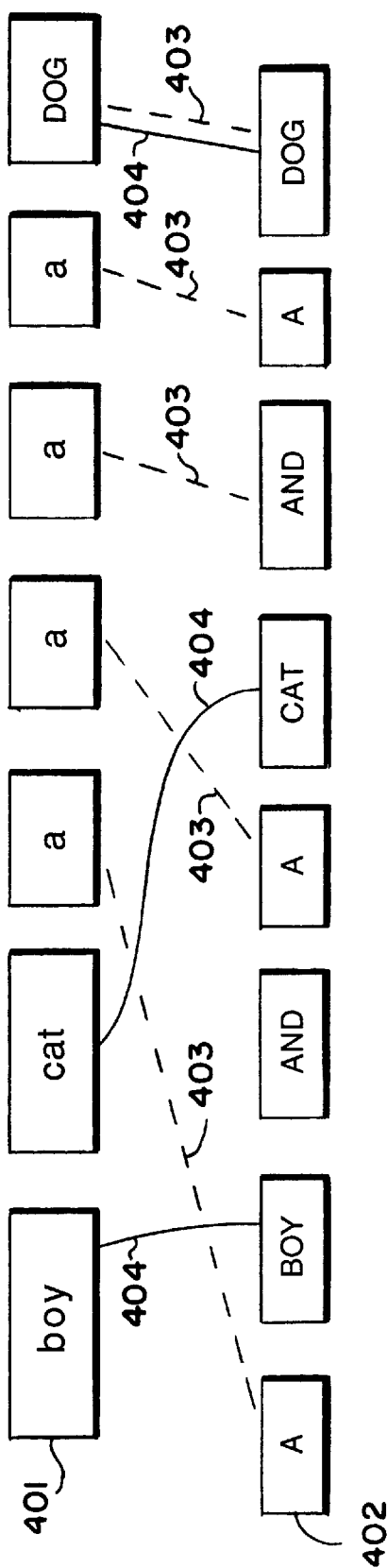
FIG. 4 is a block diagram of two possible alignments.

As shown in FIG. 4 for particular word list 401 and corresponding text segment 402, there may be several possible alignments. The dashed lines 403 indicate a one-to-one correspondence where the largest number of words are aligned. The alignment indicated by the solid lines 404 is based on preferentially aligning longer words. It is desired to chose the "best" alignments.

For example, each possible alignment can be scored. The scoring of a particular alignment can increase whenever identical words are aligned, and decrease when different words are aligned. The score can be weighted to increase the score by a greater amount for "long" words, since long words probably occur at a lesser frequency. Also, long sequences of correctly aligned words can increase the score.

For example, if the sequence of spoken words "there's a long way to go" in the audio segment 330 exactly match up with the corresponding portion of the text segment 310, then it is very likely that is what was actually said, and that the alignment is correct. If at another point in the alignment only the word "a" is matched up, then the correctness of the alignment is less certain.

Figure 5:
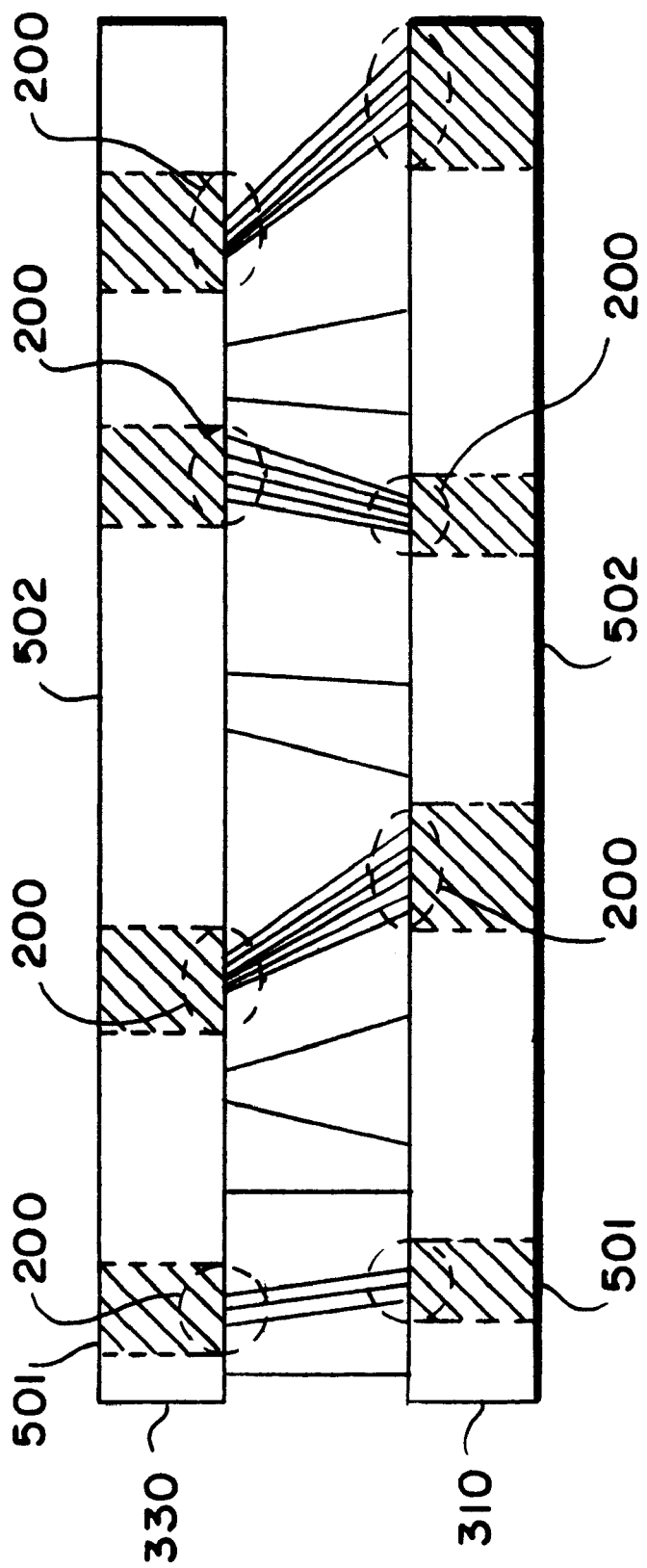
FIG. 5 is a block diagram of anchors and unaligned and aligned portions of the segments.

As shown in FIG. 5, in step 304, alignments that are most likely to be correct are chosen as "anchors" 200 in the audio segment 330 and the text segment 310. An anchor 200 is defined a place where the spoken words of the audio segment are aligned with the written words of the text segment with a reasonable degree of confidence. In a preferred embodiment, any sequence of four words is assumed to be correct. If no such sequences exist, then the threshold can be reduced to three words, and then two. Other choices are possible, such as choosing only the longest correct sequence as an anchor, or considering total word lengths in determining the length of a correct sequence. At the same time, the anchors 200 in the text segment 310 can be annotated with the corresponding timing information derived from the audio segment 330.

In step 305, the anchors 200 are used to partition the text segment 310 and the audio segment 330 into corresponding aligned segments (cross-hatched) 501 and unaligned segments 502. The starting times and durations of the segments 501 and 502 are known from the timing information used to annotate the segments.

The unaligned text and audio segments 502 are reprocessed by steps 301–305 until a desired termination conditions is reached, e.g., the text and audio files are fully aligned, or no more anchors can be detected. As an option, some of the words of an anchor 200 can begin and/or terminate each unaligned segment 502 after partitioning to increase the chance that there are some words in the unaligned segment that will be correctly recognized on the next pass.

Note, in each iteration, the vocabulary and language model 320 is rebuilt only from the words of that text segment, and only that particular V-LM 320 is used to recognize words in the current audio segment 330.

The iterations can terminate for several reasons. One is when there are no more words to align, and hence no more sub-segments. The other is when the last iteration did not find enough aligned words, so there is nothing to be gained by a further iteration. The iterations can be stopped sooner, depending on the precision desired. For example if the alignment is needed for indexing purposes the iterations could be stopped when the duration of a segment is short enough (for example, a few seconds).

Because the present method iterates over smaller and smaller unaligned segments with a more constrained vocabulary and language model, the present method is better able to overcome noise and other difficulties in the audio stream, for example, audio streams where speech and music are overlaid. In addition, the method is less likely to misalign long audio streams because a top-down approach is used, a misalignment in one segment will not influence alignment in another segment. Furthermore, the method also works when the text file does not represent the whole duration of the audio file, but only part of it. Large segments in the audio file for which there are no corresponding text segments are easily handled.

Figure 6:
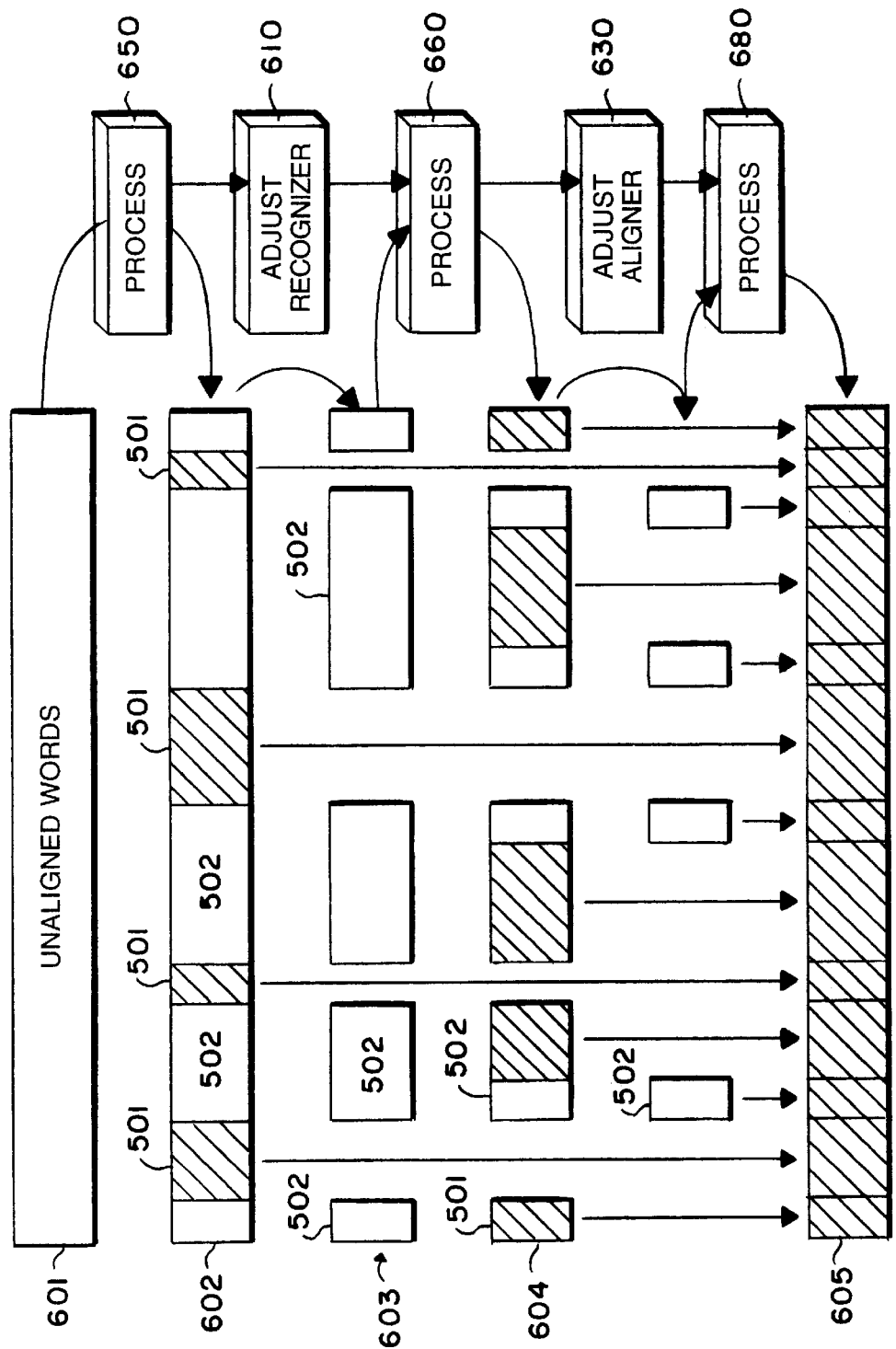
FIG. 6 is a flow diagram of adjusting the processing of the segments during successive iterations.

FIG. 6 shows the alignment and partitioning of segments over several iterations. In block 601, the words of an entire segment are unaligned. In block 602 after processing 650, the hashed portions 501 have been aligned. The unaligned portions 502 (blocks 603) are reprocessed 660 to locate further aligned portions (in blocks 604), and so forth (process 680). Block 605 shows that there are no more segments to align.

As shown in FIG. 6, the processing steps 301–305 can dynamically be adjusted in a number of ways during the iterations. For example, in step 610, the results of aligned portions are used to adjust the acoustic-phonetic models 325 of the recognizer 302. In effect, the recognizer 302 learns to better recognize the spoken words of a specific audio file. In other words, the aligned portions of the last pass become speech training data for the recognizer 302 so that the next pass over unaligned portions can be more robust.

For example, the recognizer 302 can initially be configured to work with speaker independent models. However, as the recognizer "learns" the speech of the speaker of the words of the audio file, the speech recognition acoustic-phonetic models become more speaker dependent, i.e., "better tuned." Also, for audio files of a relatively long duration, the models can be adjusted to take into consideration channel parameters such as noise, distortion, and compression techniques used on the speech, i.e., the present method deals better with difficult audio files.

As the recognizer is adjusted to improve performance, the aligner and/or anchor choser can also be adjusted in step 630 to be more or less aggressive. For example, the variables and criteria used by the dynamic programming technique of the aligner 302 can be relaxed as the recognizer improves. This means that larger sequences of aligned words will sooner be detected in subsequent iterations.

Similarly, if no anchors are identified during a single pass, the unaligned portions can be reprocessed with different scoring techniques, and so forth. With the present scheme, the precision of the alignment can be dynamically adjusted to give reasonable results for a given application.

Figure 7:
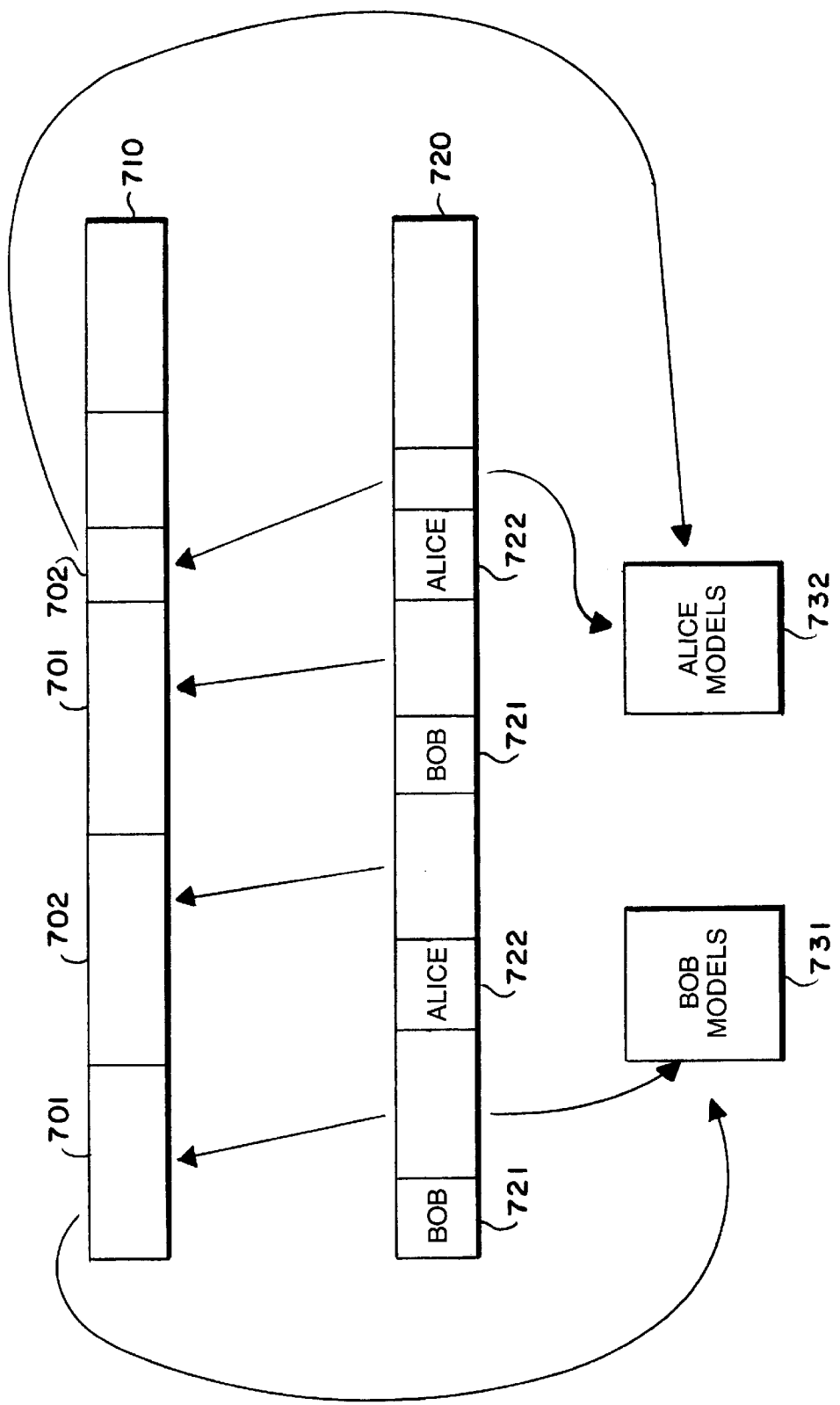
FIG. 7 is block diagram of a speaker dependent alignment process.

As shown in FIG. 7, the present technique can also be used to perform speaker identification. For example, an audio file 710 contains portions 701 spoken by a first speaker (Bob), and portions 702 spoken by a second speaker (Alice). A corresponding text file 720 is fully or partially annotated with speaker identification information, e.g., each portion of transcribed text is preceded with corresponding speaker identifications 721 and 722. Now, the recognizer 302 can develop separate acoustic-phonetic models 731 and 732 for the multiple speakers. After the models are "trained," speaker recognition can automatically be performed.

This technique can also be used to perform "automatic" closed captioning. For example, a first tape of a news program is fully or partially transcribed with the "newscaster" identification as described above. After, the recognizer 302 has been trained for a particular "set" of "newscasters," subsequent video (or audio) tapes can be transcribed to generate text files without explicit identification of the speakers. The models 325 can be adjusted as the "cast" of the news program changes.

In summary, the present method is a top-down iterative alignment process, and not a sequential left-to-right alignment. During each iteration on a segment, the recognizer operates on time varying signal to recognize tokens, and aligns the tokens with digital versions of the tokens. Unaligned tokens are reprocessed. This technique can also be used to align other types of signals in, for example, automatic handwriting and lip reading systems.

It is understood that the above-described embodiments are simply illustrative of the principles of the invention. Various other modifications and changes may be made by those skilled in the art which will embody the principles of the invention and fall within the spirit and scope thereof.

We claim:

1. A computerized method for aligning text segments of a text file with audio segments of an audio file, comprising the steps of:

generating a vocabulary and language model from the text file, generation of said model involving determination of relative probabilities of all one, two, and three word sequences in all unaligned text segments of the text file based upon frequencies of occurrences of said sequences in said unaligned text segments, all of said text segments being initially classified as unaligned text segments;

recognizing a word list from the audio segments using the vocabulary and language model but without considering the text file;

aligning the word list with the text segments based upon respective scores for all possible alignments of words in the word list with the text segments, each respective score being weighted to increase each respective score by a relatively greater amount if a respective alignment associated with the respective score involves relatively longer sequences of correctly aligned words;

choosing corresponding anchors in the word list and text segments in accordance with the respective scores;

partitioning the text and the audio segments into unaligned and aligned text and audio segments according to the anchors; and repeating the generating, recognizing, aligning, choosing, and partitioning steps with the unaligned text and audio segments until a termination condition is reached.

2. The method of claim 1 wherein the text segments correspond to the entire text file, and the audio segments correspond to the entire audio file.

3. The method of claim 1 wherein the language model is in the form of trigrams.

4. The method of claim 1 wherein the word list includes a sequential list of recognized spoken words of the audio segments.

5. The method of claim 1 further including the step of annotating the word list with timing information.

6. The method of claim 4 wherein the timing information includes the starting time and duration of each recognized spoken word.

7. The method of claim 1 wherein the word list is recognized using acoustic-phonetic models of a speech recognizer.

8. The method of claim 1 further including the steps of determining a plurality of possible alignments, scoring each possible alignment, and selecting a best alignment using dynamic programming.

9. The method of claim 8 further including the step of increasing the score of a particular possible alignment when the particular possible alignment includes a relatively long sequence of correctly aligned words.

10. The method of claim 5 further including the step of annotating the text segments with the timing information for correctly aligned words of the audio segments.

11. The method of claim 1 wherein the termination condition occurs when all of the text and audio segments are fully aligned.

12. The method of claim 1 wherein the termination condition is a detection of all anchors in the text and audio segments.

13. The method of claim 1 wherein the termination condition is reached for a particular unaligned segment if the particular unaligned segment has a duration less than a predetermined threshold.

14. The method of claim 1 wherein the unaligned segments include portions of adjacent aligned segments.

15. The method of claim 1 wherein the vocabulary and language model is rebuilt from the unaligned segments during repeated iterations of the generating step.

16. The method of claim 1 wherein the text segments correspond to a portion of the audio segments.

17. The method of claim 7 wherein the acoustic-phonetic models are dynamically adjusted during repeated iterations according to the aligned segments.

18. The method of claim 7 wherein the acoustic-phonetic models are dynamically adjusted during repeated iterations to take into consideration channel characteristics.

19. The method of claim 17 wherein the acoustic-phonetic models initially are speaker independent, and the acoustic-phonetic models are adjusted to be speaker dependent during the iterations.

20. The method of claim 19 wherein the text segments are annotated with speaker identification information for a plurality of speakers, and further including the step of adjusting the acoustic-phonetic models to include a plurality of speaker dependent models.

21. The method of claim 20 wherein corresponding text segments are generated from particular audio segments using the plurality of speaker dependent models.

22. An apparatus for aligning text segments of a text file with audio segments of an audio file, comprising:

an analyzer for analyzing the text segments to generate a vocabulary and language mode, generation of said model involving determination of relative probabilities of all one, two, and three word sequences in all unaligned text segments of the text file based upon frequencies of occurrences of said sequences in said unaligned text segments, all of the text segments of the text file being initially classified as unaligned text segments;

a speech recognizer for generating a word list from the audio segments using the vocabulary and language model but without considering the text file;

an aligner for aligning the word list with the text segments based upon respective scores for all possible alignments of words in the word list with the text segments, each respective score being weighted to increase each respective score by a relatively greater amount if a respective alignment associated with the respective score involves relatively longer sequences of correctly aligned words:

an anchor choosing mechanism for choosing corresponding anchors in the word list and text segments in accordance with the respective scores;

a partitioning mechanism for partitioning the text and the audio segments into unaligned and aligned segments according to the anchors; and a repetition mechanism for repeating the generating, recognizing, aligning, choosing, and partitioning steps with the unaligned segments until a termination condition is reached.

* * * * *